United States Patent
Yang et al.

(10) Patent No.: US 11,113,838 B2
(45) Date of Patent: Sep. 7, 2021

(54) DEEP LEARNING BASED TATTOO DETECTION SYSTEM WITH OPTIMIZED DATA LABELING FOR OFFLINE AND REAL-TIME PROCESSING

(71) Applicant: NEC Laboratories America, Inc., Princeton, NJ (US)

(72) Inventors: Yi Yang, Princeton, NJ (US); Srimat Chakradhar, Manalapan, NJ (US); Tarang Chugh, Lansing, MI (US)

(73) Assignee: NEC Corporation

(*) Notice: Subject to any disclaimer, the term of this patent is extended or adjusted under 35 U.S.C. 154(b) by 4 days.

(21) Appl. No.: 16/814,248

(22) Filed: Mar. 10, 2020

(65) Prior Publication Data

US 2020/0311962 A1 Oct. 1, 2020

Related U.S. Application Data

(60) Provisional application No. 62/823,960, filed on Mar. 26, 2019.

(51) Int. Cl.
*G06T 7/70* (2017.01)
*G06F 16/58* (2019.01)
(Continued)

(52) U.S. Cl.
CPC ............ *G06T 7/70* (2017.01); *G06F 16/5866* (2019.01); *G06K 9/6256* (2013.01); *G06N 3/04* (2013.01);
(Continued)

(58) Field of Classification Search
CPC ......... G06T 7/11; G06T 7/70–90; G06T 1/20; G06T 3/40; G06T 2207/20081;
(Continued)

(56) References Cited

U.S. PATENT DOCUMENTS 10,095,938 B2* 10/2018 Lo .................... G06K 9/4671
10,679,092 B2* 6/2020 Hougen ............ G06K 9/00885
(Continued)

OTHER PUBLICATIONS

"Tattoo Image Search at Scale: Joint Detection and Compact Representation Learning"; Hu Han, IEEE Transactions on Pattern Analysis and Machine Intelligence, vol. 41, No. 10, Oct. 2019 (Year: 2019).*

(Continued)

*Primary Examiner* — Michael S Osinski
(74) *Attorney, Agent, or Firm* — Joseph Kolodka

(57) ABSTRACT

A computer-implemented method executed by at least one processor for detecting tattoos on a human body is presented. The method includes inputting a plurality of images into a tattoo detection module, selecting one or more images of the plurality of images including tattoos with at least three keypoints, the at least three keypoints having auxiliary information related to the tattoos, manually labeling tattoo locations in the plurality of images including tattoos to create labeled tattoo images, increasing a size of the labeled tattoo images identified to be below a predetermined threshold by padding a width and height of the labeled tattoo images, training two different tattoo detection deep learning models with the labeled tattoo images defining tattoo training data, and executing either the first tattoo detection deep learning model or the second tattoo detection deep learning model based on a performance of a general-purpose graphical processing unit.

20 Claims, 9 Drawing Sheets

(51) Int. Cl.
  *G06N 3/08* (2006.01)
  *G06N 3/04* (2006.01)
  *G06T 1/20* (2006.01)
  *G06T 3/40* (2006.01)
  *G06T 7/90* (2017.01)
  *G06K 9/62* (2006.01)

(52) U.S. Cl.
  CPC .............. *G06N 3/08* (2013.01); *G06T 1/20* (2013.01); *G06T 3/40* (2013.01); *G06T 7/90* (2017.01); *G06T 2207/20081* (2013.01)

(58) Field of Classification Search
  CPC . G06T 2207/20084; G06T 2207/30196; G06T 2207/30232; G06F 16/583–5866; G06N 3/04–088; G06K 9/6256; G06K 9/6272; G06K 9/4628; G06K 9/3241; G06K 9/00818; G06K 9/6257; G06K 9/627; G06K 9/6271; G06K 9/3233; G06K 9/4604; G06K 9/4638; G06K 9/46; G06K 9/4609
  See application file for complete search history.

(56) References Cited

U.S. PATENT DOCUMENTS

| | | | | |
|---|---|---|---|---|
| 10,846,552 | B1* | 11/2020 | Wu | G06F 16/583 |
| 2009/0231424 | A1* | 9/2009 | Honda | G06T 7/0006 348/87 |
| 2014/0164413 | A1* | 6/2014 | Matsumoto | G06K 9/4642 707/756 |
| 2014/0270536 | A1* | 9/2014 | Amtrup | G06K 9/00483 382/195 |
| 2016/0307057 | A1* | 10/2016 | Li | G06K 9/6202 |
| 2017/0116498 | A1* | 4/2017 | Raveane | G06K 9/6257 |
| 2017/0323452 | A1* | 11/2017 | Chen | G06F 17/18 |
| 2018/0075603 | A1* | 3/2018 | Hougen | G06K 9/4642 |
| 2018/0330193 | A1* | 11/2018 | Ikeda | G06K 9/00624 |
| 2019/0057233 | A1* | 2/2019 | Scott | G06K 9/20 |
| 2019/0102640 | A1* | 4/2019 | Balasubramanian | G06F 3/0656 |
| 2019/0108631 | A1* | 4/2019 | Riley | G06T 7/0004 |
| 2019/0279045 | A1* | 9/2019 | Li | G06K 9/3241 |
| 2019/0311210 | A1* | 10/2019 | Chatterjee | G06N 3/0445 |
| 2019/0318194 | A1* | 10/2019 | Liu | G06T 7/12 |
| 2019/0347497 | A1* | 11/2019 | Wang | G06K 9/00818 |
| 2020/0074149 | A1* | 3/2020 | Zhang | G06K 9/4628 |
| 2020/0134377 | A1* | 4/2020 | Attorre | G06K 9/6274 |
| 2020/0272902 | A1* | 8/2020 | Feng | G06K 9/4628 |
| 2020/0364888 | A1* | 11/2020 | Tsai | G06N 3/04 |
| 2020/0372268 | A1* | 11/2020 | Duan | G06K 9/6215 |
| 2020/0372332 | A1* | 11/2020 | Kimura | G06N 3/063 |
| 2020/0380712 | A1* | 12/2020 | Jiang | G06K 9/0063 |
| 2020/0410510 | A1* | 12/2020 | Lau | G06N 3/08 |
| 2021/0027095 | A1* | 1/2021 | Kamada | G06K 9/6232 |
| 2021/0042917 | A1* | 2/2021 | Hirai | G06F 30/27 |
| 2021/0064934 | A1* | 3/2021 | Swaminathan | G06K 9/627 |

OTHER PUBLICATIONS

"Tattoo Skin Cross—correlation Neural Network"; Pruegsa Duangphasuk, 2014 International Symposium on Communications and Information Technologies (ISCIT) (Year: 2014).*

"Tattoo Detection and Localization using Region-based Deep Learning"; Zhaohui H. Sun, 2016 23rd International Conference on Pattern Recognition (ICPR), Cancún Center, Cancún, México, Dec. 4-8, 2016 (Year: 2016).*

Han et al., "Tattoo based Identification: Sketch to Image Matching", 2013 International Conference on Biometrics. Jun. 4, 2013. pp. 1-8)

Hrkac et al., "Deep Learning Architectures for Tattoo Detection and De-identification", 2016 First international Workshop on Sensing, Processing and Learning for Intelligent Machines. Jul. 6, 2016. (pp. 1-5.).

Xu et al., "Tattoo Detecton Based on CNN and Remarks on the NIST Database", 2016 International Conference on Biometrics. Jun. 13, 2016. (pp. 1-8.).

* cited by examiner

DEEP LEARNING BASED TATTOO DETECTION SYSTEM WITH OPTIMIZED DATA LABELING FOR OFFLINE AND REAL-TIME PROCESSING

RELATED APPLICATION INFORMATION

This application claims priority to Provisional Application No. 62/823,960, filed on Mar. 26, 2019, incorporated herein by reference in its entirety.

BACKGROUND

Technical Field

The present invention relates to neural networks and, more particularly, to employing deep learning detection models to detect tattoos which can be used to identify individuals by their tattoos.

Description of the Related Art

Recently there has been a tremendous increase in the accuracy of object detection by employing deep convolutional neural networks (CNNs). This has made visual object detection an attractive possibility for domains ranging from surveillance to autonomous driving. However, speed is a key requirement in many applications, which fundamentally contends with demands on accuracy. Thus, while advances in object detection have relied on increasingly deeper architectures, such architectures are associated with an increase in computational expense at runtime.

SUMMARY

A computer-implemented method executed by at least one processor for detecting tattoos on a human body is presented. The method includes inputting a plurality of images into a tattoo detection module, selecting one or more images of the plurality of images including tattoos with at least three keypoints, the at least three keypoints having auxiliary information related to the tattoos, manually labeling tattoo locations in the plurality of images including tattoos to create labeled tattoo images, increasing a size of the labeled tattoo images identified to be below a predetermined threshold by padding a width and height of the labeled tattoo images, training two different tattoo detection deep learning models with the labeled tattoo images defining tattoo training data, and executing either the first tattoo detection deep learning model or the second tattoo detection deep learning model based on a performance of a general-purpose graphical processing unit (GPGPU).

A system for detecting tattoos on a human body is also presented. The system includes a memory and a processor in communication with the memory, wherein the processor is configured to input a plurality of images into a tattoo detection module, select one or more images of the plurality of images including tattoos with at least three keypoints, the at least three keypoints having auxiliary information related to the tattoos, manually label tattoo locations in the plurality of images including tattoos to create labeled tattoo images, increase a size of the labeled tattoo images identified to be below a predetermined threshold by padding a width and height of the labeled tattoo images, train two different tattoo detection deep learning models with the labeled tattoo images defining tattoo training data, and execute either the first tattoo detection deep learning model or the second tattoo detection deep learning model based on a performance of a general-purpose graphical processing unit (GPGPU).

A non-transitory computer-readable storage medium comprising a computer-readable program is presented for detecting tattoos on a human body, wherein the computer-readable program when executed on a computer causes the computer to perform the steps of inputting a plurality of images into a tattoo detection module, selecting one or more images of the plurality of images including tattoos with at least three keypoints, the at least three keypoints having auxiliary information related to the tattoos, manually labeling tattoo locations in the plurality of images including tattoos to create labeled tattoo images, increasing a size of the labeled tattoo images identified to be below a predetermined threshold by padding a width and height of the labeled tattoo images, training two different tattoo detection deep learning models with the labeled tattoo images defining tattoo training data, and executing either the first tattoo detection deep learning model or the second tattoo detection deep learning model based on a performance of a general-purpose graphical processing unit (GPGPU).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
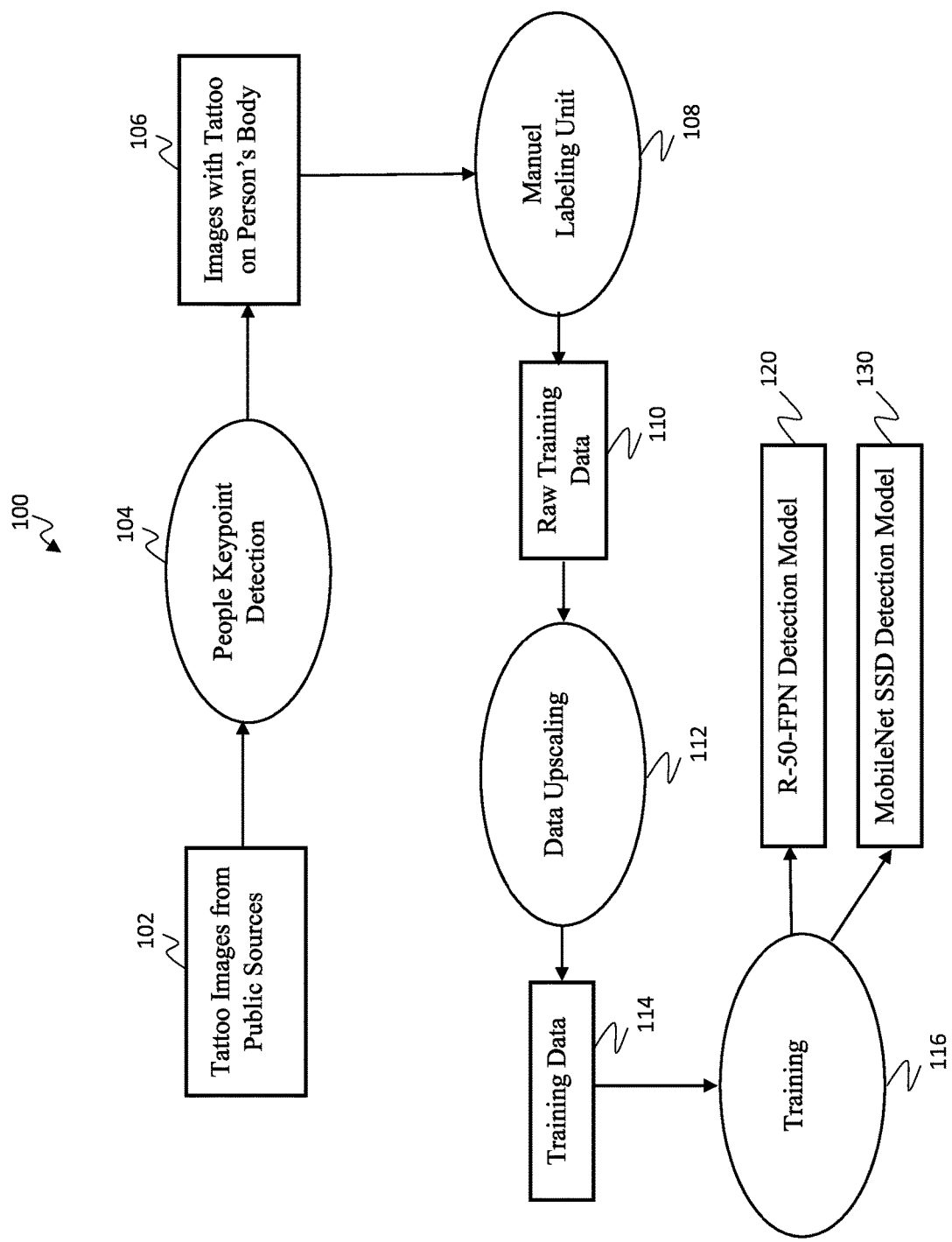
FIG. 1 is a block/flow diagram illustrating a training process for tattoo detection, in accordance with embodiments of the present invention.

The exemplary embodiments of the present invention employ deep learning networks for tattoo identification. Soft biometrics are physiological and behavioral characteristics that provide some identifying information about an individual. Color of eye, gender, ethnicity, skin color, height, weight, hair color, scar, birthmarks, and tattoos are examples of soft biometrics. In particular, person identification and retrieval systems based on tattoos have gained a lot of interest.

The exemplary embodiments of the present invention disclose systems and methods for employing deep learning models for tattoo detection. The exemplary embodiments first develop an acceptable dataset for tattoo detection, which requires images with tattoo objects and sufficient background information. Therefore, the exemplary systems and methods first use a keypoint detection model to find tattoo images on human bodies, which are considered background for tattoos (auxiliary or supplemental or additional information related to the tattoos). Then, the exemplary systems and methods label tattoo objects based on physical connections, color styles, and/or drawing styles. Also, the exemplary systems and methods increase sizes for small tattoos to avoid poor accuracy of deep learning models on small sizes of objects. Finally, the exemplary systems and methods employ two deep learning models, R-50-FPN (feature pyramid network) and MobileNet-SSD (single shot detector) for both high accuracy and fast speed.

The exemplary embodiments of the present invention disclose systems and methods for preparing training data for the tattoo detector and a systematic way to label tattoo detection data and detect tattoos from video streaming or offline videos. The detection model is based on deep learning models, and, therefore, the first step is to collect and filter training data from datasets. Since most of tattoo datasets include only tattoos, while images of a video stream in a real life include all different objects such as people, trees, flowers, buildings, cars, other peripheral objects, etc., it is important to find out whether these images include multiple objects in these datasets for training purposes. On the other hand, tattoos always exist on the human body. Therefore, a people detection model with multiple key points is used to find people in the tattoo datasets. In order to avoid images with only tattoo objects, only images with people's bodies are used, and then the tattoo location is labeled within each person's body.

Then, to be consistent, during labeling the exemplary embodiments provide a set of approaches to group multiple tattoo areas into a tattoo object when multiple tattoo areas are physical connected or their bounding boxes are overlapped, when these areas have a similar and/or color style, and when there are lots of small areas. Also, the exemplary embodiments observe that deep learning models have poor accuracy for objects with small sizes. Therefore, the exemplary embodiments pad the tattoo objects whose sizes are smaller than, e.g., 32×32 pixels to increase their sizes so that these tattoo objects can be detected by deep learning models more accurately. Finally, in order to handle different scenarios including streaming and offline processing, and systems with general-purpose graphical processing units (GPGPUs) or without GPGPUs, the exemplary embodiments train the data by using two deep learning models, that is, R-50-FPN (feature pyramid network) and MobileNet-SSD (single shot detector). The tattoo detection system uses the R-50-FPN model for better accuracy if the system has a high performance GPGPU for a real-time streaming or offline videos. The MobileNet-SSD model is used for fast execution for real-time streaming on a system without GPGPUs.

Moreover, the exemplary embodiments of the present invention can be applied to different real-world practical applications. In one instance, such deep learning tools can be very useful for law enforcement personnel. For example, in one practical application, detecting tattoo images stored in information technology (IT) devices of suspects is an important but challenging task for law enforcement agencies. Searching evidence in IT devices of suspects, e.g., servers, laptops, tablets and smartphones, is an essential but challenging task for law enforcement agencies because of the importance of the evidence and the huge and increasing storage capacity of the devices. Even in one single case, data seized by law enforcement agencies to be investigated can be several terabytes. It is impossible to check all the data manually. Several face recognition detectors have been employed. However, tattoo detection in images has not been extensively studied. The exemplary embodiments of the present invention address such issues by identifying tattoos on a person's body, labeling tattoos, and employing two deep learning models for tattoo detection for different scenarios.

In another instance, the problem of privacy invasion has become increasingly important in recent decades, with the widespread use of video recording devices to obtain recordings of people in various scenarios. In order to reduce privacy risks, the protection of personal data is nowadays strictly regulated by law in many jurisdictions, requiring the stored data to be de-identified. In the case of images, de-identification of personal data entails obfuscating or removing personally identifying features of the filmed individuals, usually in a reversible fashion so that law enforcement can access them if necessary. However, de-identification techniques usually involve obscuring or blurring the face of a person. Thus, this approach does not take into account soft biometric and non-biometric feature, such as tattoos. As a result, even though the face of the person has been obscured, the person can still be potentially identified by a unique or distinctive tattoo that is clearly visible. The exemplary embodiments of the present invention can potentially address such issues by identifying tattoos on a person, extracting features from the identified tattoos, and then storing the labeled tattoos in one or more tattoo image databases.

Regarding neural networks, neural networks use artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

The neural network may include a plurality of hidden layers. A neural network including the plurality of hidden layers may be referred to as a deep neural network. Training the deep neural network may be referred to as deep learning. Nodes included in the hidden layers may be referred to as hidden nodes. The number of hidden layers provided in a deep neural network is not limited to any particular number.

The neural network may be trained through supervised learning. Supervised learning refers to a method of providing input data and output data corresponding thereto to a neural network, and updating connection weights of edges so that the output data corresponding to the input data may be output. For example, a model training apparatus may update connection weights of edges among artificial neurons through a delta rule and error back-propagation learning.

Error back-propagation learning refers to a method of estimating a loss with respect to input data provided through forward computation, and updating connection weights to reduce a loss in a process of propagating the estimated loss in a backward direction from an output layer toward a hidden layer and an input layer. Processing of the neural network may be performed in an order of the input layer, the hidden layer, and the output layer. However, in the error back-propagation learning, the connection weights may be updated in an order of the output layer, the hidden layer, and the input layer. Hereinafter, according to an exemplary embodiment, training a neural network refers to training parameters of the neural network. Further, a trained neural network refers to a neural network to which the trained parameters are applied.

FIG. 1 is a block/flow diagram illustrating a training process for tattoo detection, in accordance with embodiments of the present invention.

In training system 100, tattoo images 102 are collected from a plurality of public sources. For example, law enforcement has assembled databases with tattoo images of people who have been arrested. Additionally, prisons can keep their own databases with tattoo images of inmates. A detection model 104 is employed to detect or identify a person body's keypoints. The detection model 104 can be referred to as a people keypoint detection model. The detection model 104 detects all persons in all images. However, not all images with persons are used. The training system 100 uses only images 106 where at least three keypoints are detected. If only a small portion of a person's body is exposed, then such tattoo images are not used, but rejected by the system 100. For example, if the entire chest of the male individual is exposed, as well as the entire back, then such images including tattoos are used as they provide ancillary or auxiliary or supplemental information (e.g., related to body location of the tattoos). In one example, an image of a male individual only wearing shorts reveals a plurality of tattoos on his legs, his arms, his chest, his back, and his face. This image thus contains information regarding the location of each tattoo on the individual's body. The location of the tattoo on the body of the male individual in combination with the features of each of the tattoos can provide more useful or beneficial information (related to the identified tattoos). An image of a tattoo that is zoomed in only to illustrate the tattoo itself (without knowing, e.g., where the tattoo is located) is not as valuable or beneficial for the purposes of the training system 100. Thus, the detection model 104 employs images 106 including a tattoo with at least three keypoints of a human body to provide for sufficient auxiliary or supplemental information related to the identified tattoos.

The extracted images 106 are then manually labeled by labeling unit 108. The labeled images are used as raw training data 110. The raw training data 110 is provided to the data upscaling module 112. The data upscaling module 112 increases the size of the labeled tattoos. If the size is too small, e.g., less than 32×32 pixels, then data upscaling can take place. The training data 114 is then used for training 116 by two deep learning models 120, 130. The first deep learning model 120 can be, e.g., a R-50-FPN model and the second deep learning model 130 can be, e.g., a MobileNet SSD model. The R-50-FPN model 120 has better accuracy, but is slower, and needs a high performance GPGPU for real-time processing, whereas the MobileNet SSD model 130 is much smaller, and has a faster execution time but with lower accuracy.

The R-50-FPN model 120 is a feature pyramid network (FPN) for object detection. Detecting objects in different scales is challenging, in particular, for small objects. A pyramid of the same image at different scale can be used to detect objects. However, processing multiple scale images is time consuming and the memory demand is too high to be trained end-to-end simultaneously. Hence, it can be used in inference to push accuracy as high as possible, in particular for competitions, when speed is not a concern. Alternatively, a pyramid of features can be created and used for object detection. However, feature maps closer to the image layer composed of low-level structures that are not effective for accurate object detection. FPN is a feature extractor designed for such pyramid concept with accuracy and speed in mind. FPN replaces the feature extractor of detectors like Faster R-CNN and generates multiple feature map layers (multi-scale feature maps) with better quality information than the regular feature pyramid for object detection. FPN includes a bottom-up and a top-down pathway. The bottom-up pathway is the usual convolutional network for feature extraction. As we go up, the spatial resolution decreases. With more high-level structures detected, the semantic value for each layer increases. FPN provides a top-down pathway to construct higher resolution layers from a semantic rich layer. While the reconstructed layers are semantic strong but the locations of objects are not precise after all the down-sampling and up-sampling. Lateral connections are added between reconstructed layers and the corresponding feature maps to help the detector to predict the location betters. FPN also acts as skip connections to make training easier.

The MobileNet SSD model 130 is based on depthwise separable convolutions which is a form of factorized convolutions which factorize a standard convolution into a depthwise convolution and a 1×1 convolution called a pointwise convolution. For MobileNets the depthwise convolution applies a single filter to each input channel. The pointwise convolution then applies a 1×1 convolution to combine the outputs the depthwise convolution. A standard convolution both filters and combines inputs into a new set of outputs in one step. The depthwise separable convolution splits this into two layers, a separate layer for filtering and a separate layer for combining. This factorization has the effect of drastically reducing computation and model size FIG. 2 is a block/flow diagram 200 illustrating a tattoo detection system for both real-time streaming and offline videos, in accordance with embodiments of the present invention.

Figure 2:
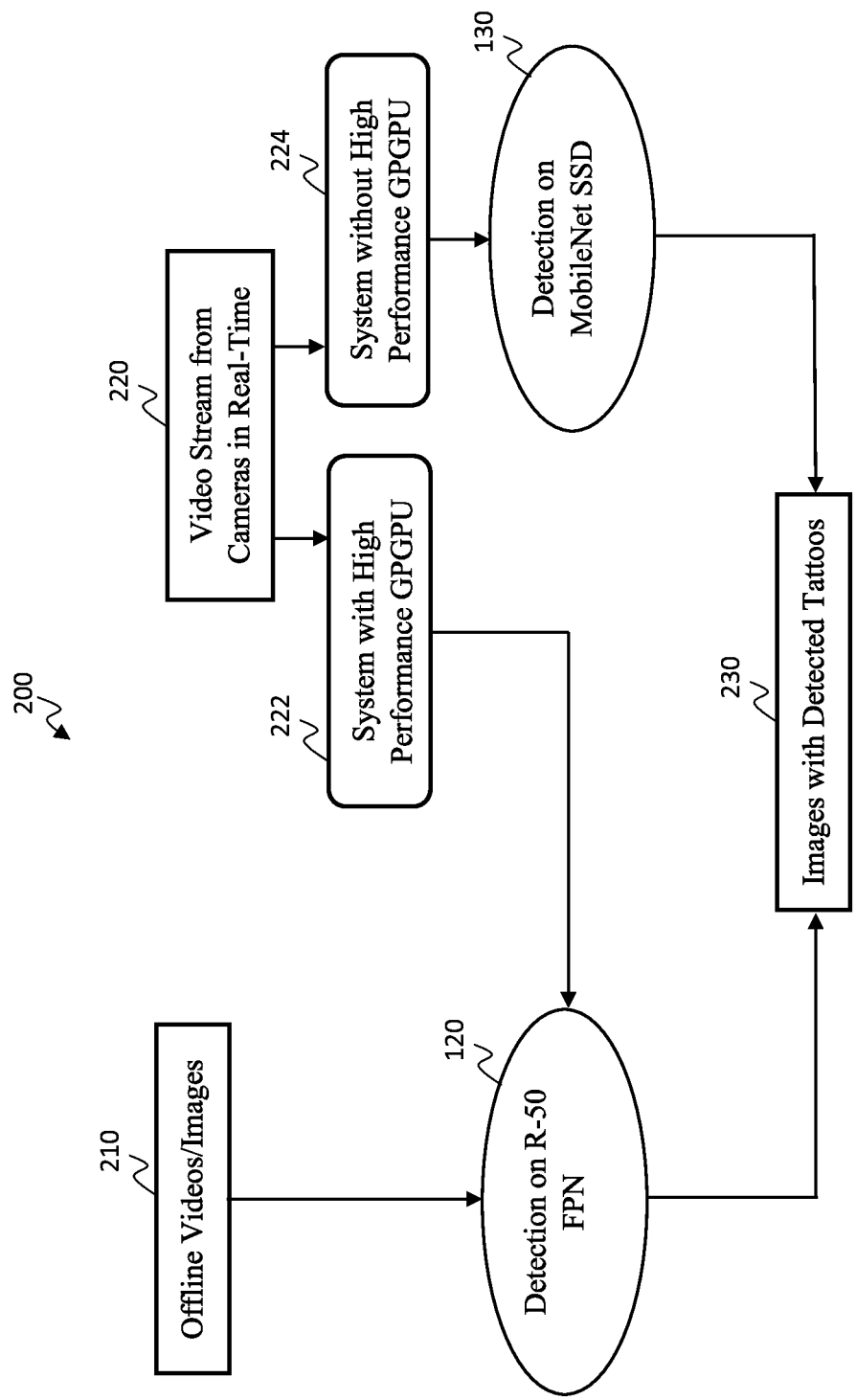
FIG. 2 is a block/flow diagram illustrating a tattoo detection system for both real-time streaming and offline videos, in accordance with embodiments of the present invention.

FIG. 2 illustrates how to use two deep learning models 120, 130 for tattoo detection. The exemplary embodiments support both offline video/images 210 and real-time video streaming 220 from a plurality of cameras. For offline videos 210, the exemplary embodiments use the model R-50-FPN 120 for better accuracy. For real-time streaming 220, if the exemplary embodiments have a GPGPU (system 222), the exemplary embodiments can use the GPGPU to accelerate the object detection process, and, therefore, the exemplary embodiments use R-50-FPN too. Otherwise, if no GPGPU is necessary (system 224) the exemplary embodiments sacrifice the accuracy and use the MobileNet-SSD model 130 to achieve real-time processing in a system without GPGPU for video streaming. The models 120, 130 output the images 230 with the location information of tattoos.

Figure 3:
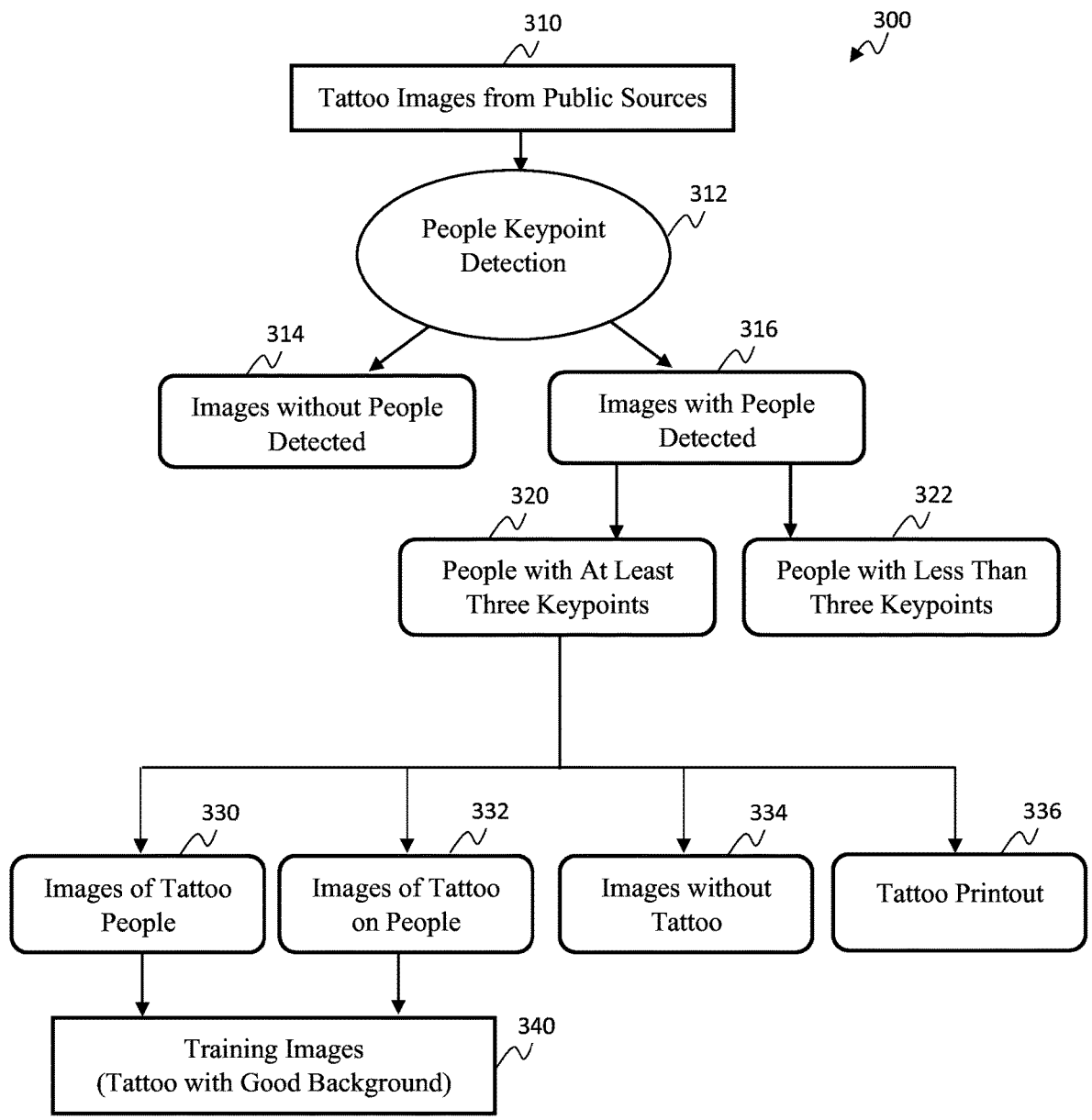
FIG. 3 is a block/flow diagram illustrating using keypoints to find tattoo images with acceptable background information, in accordance with embodiments of the present invention.

FIG. 3 is a block/flow diagram 300 illustrating using keypoints to find tattoo images with acceptable background information, in accordance with embodiments of the present invention.

Tattoo images 310 are collected from a plurality of public sources. A people keypoint detection model 312 is applied on all the collected images. The keypoint detection model 312 first removes all images 314 without people and only keep images 316 with people detected. For all images 316 with people, the exemplary embodiments check the number of keypoints of each person. If a person has at least three keypoints, the exemplary embodiments will keep such three keypoint images 320, which include the person. These keypoints can include people's face, nose, eyes, mouth, chest, legs, knees, etc. The images 322 with less than three keypoints are discarded.

For all images 320 with people including at least three keypoints, the exemplary embodiments manually inspect these images 320, and remove the following images: images 334 without tattoos due to the poor quality of a public tattoo dataset and tattoo printouts 336, which is a drawing tattoo on paper or computer instead of on a human body. The exemplary embodiments only keep images 330 of tattoo people and images 332 of tattoos on people. The images 330 include tattoos which present persons and are kept as training data. The images 332 include tattoos on human bodies, and the human bodies provide enough background information (or supplemental or auxiliary or ancillary information) for tattoo detections. The images 330, 332 are used as training data 340 for tattoo detection labeling.

Figure 4:
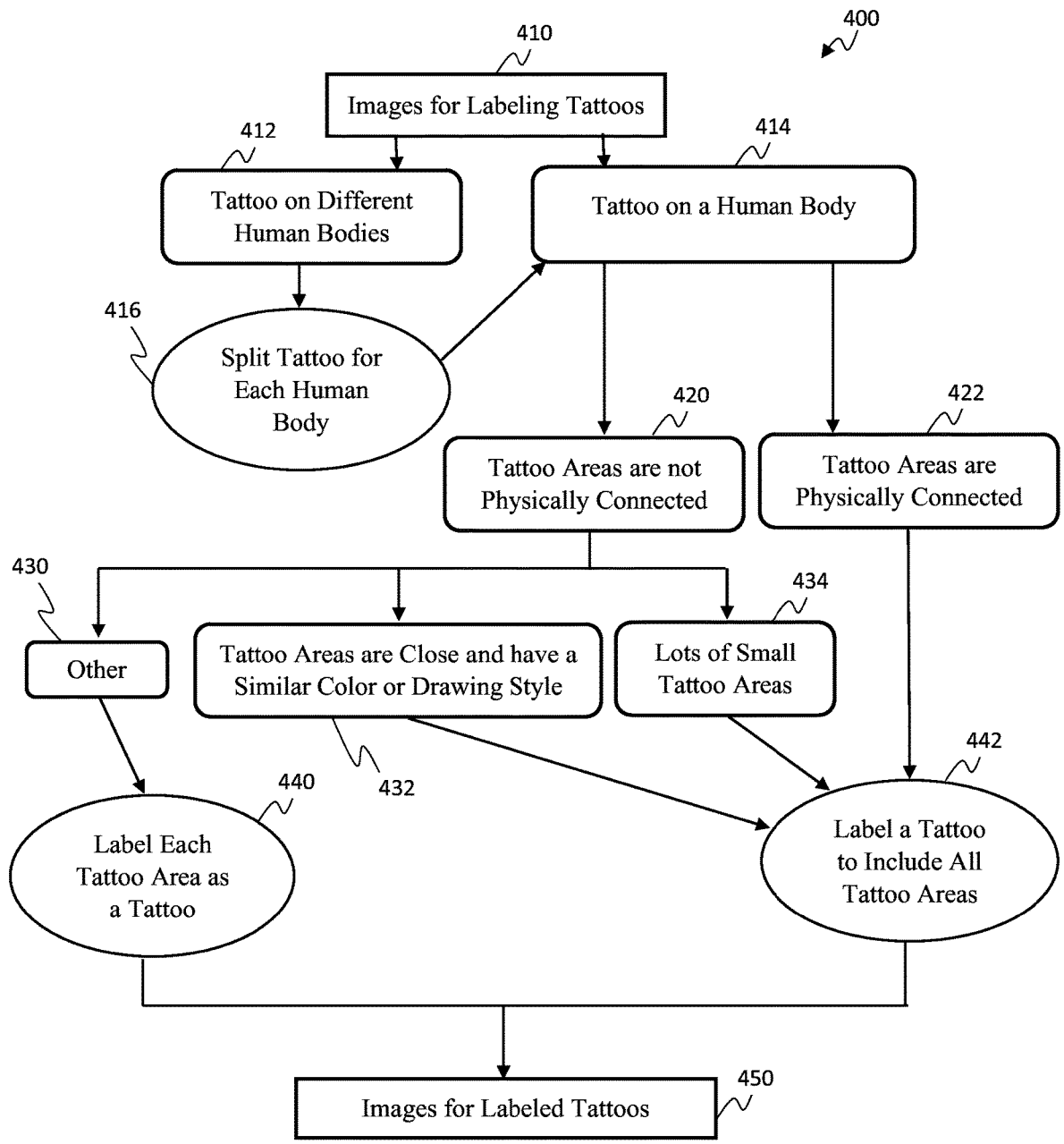
FIG. 4 is a block/flow diagram illustrating manual labeling, in accordance with embodiments of the present invention.

FIG. 4 is a block/flow diagram 400 illustrating manual labeling, in accordance with embodiments of the present invention.

FIG. 4 illustrates how to use label tattoo objects. Since a tattoo is one type of art, the definition of a tattoo object can be different for different people. For example, a house includes multiple windows and doors. In real life, if one defines the object as a house, one labels the whole house, and if one defines the object as a door, one labels each door. However, for a tattoo picture, which includes a house, the exemplary embodiments have to make a decision between the whole object (house) and individual objects (door and window), since inconsistent labeling will lead to bad detection performance.

The images 410 for labeling tattoos are used to isolate tattoos 412 in different human bodies (split tattoo in block 416). In other words, tattoos on different human bodies must be different tattoo objects. For tattoos 414 on a human body, the exemplary embodiments check whether these tattoos are connected physically. For tattoos connected physically (block 422), the exemplary embodiments define a tattoo object 442 which covers all these tattoo (areas). For tattoos not connected physically (block 420), the exemplary embodiments verify the relationship between these tattoos. If these tattoos are very small (block 434) and there are a large number of these tattoos, they are grouped in a tattoo object 442. If these tattoos have a similar color style or drawing style (block 432), they are grouped into a tattoo object 442. Otherwise, as shown in block 430, if tattoos are not physically connected, have different draw styles, and have a limited number, they are assigned to a tattoo object 440 for each one. The labeled tattoo images 450 are then completed.

Figure 5:
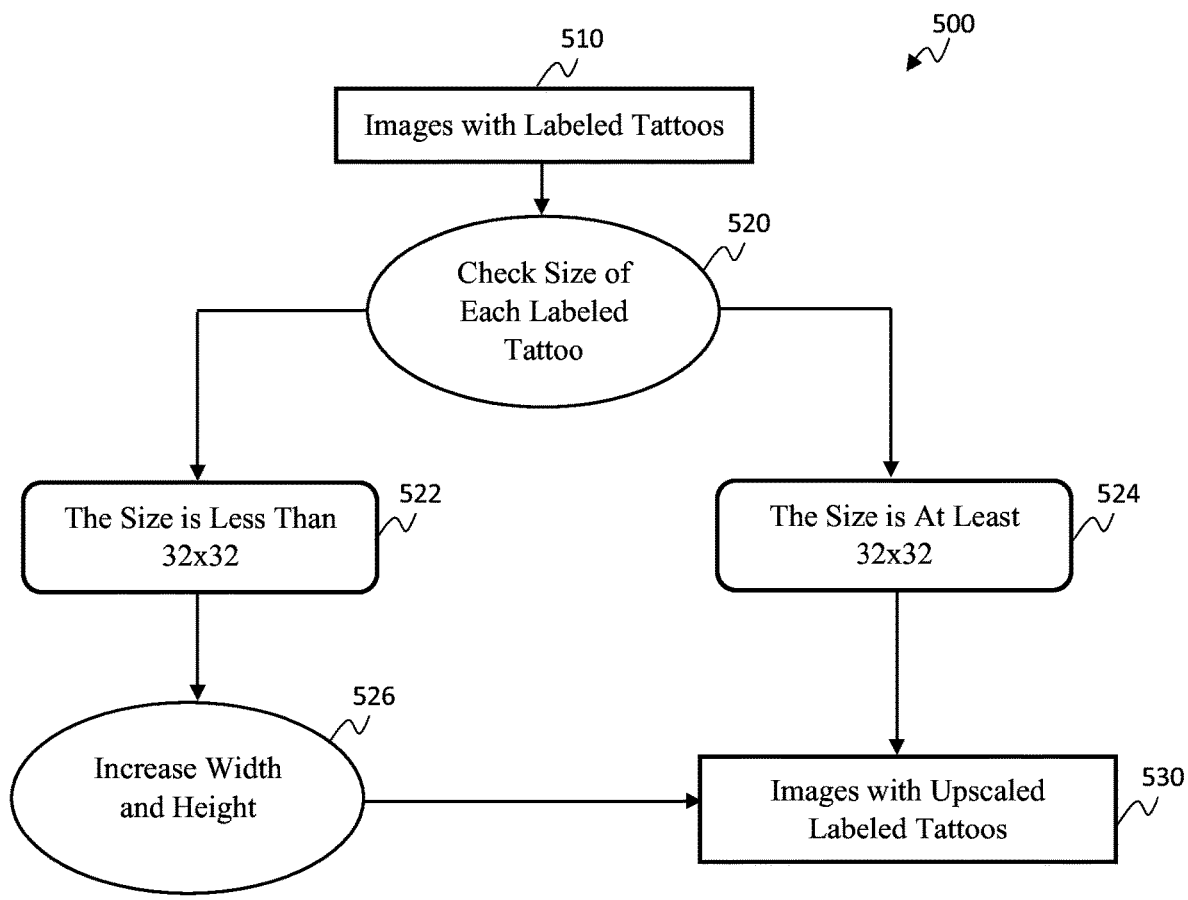
FIG. 5 is a block/flow diagram illustrating data upscaling, in accordance with embodiments of the present invention.

FIG. 5 is a block/flow diagram 500 illustrating data upscaling, in accordance with embodiments of the present invention.

FIG. 5 illustrates how to handle small size tattoos. If a tattoo has a very small size, the pixels used for training and verification are very limited and will result in a low accuracy. Furthermore, the deep learning models used also perform poorly for small size objects. Therefore, the exemplary embodiments upscale the size of these tattoos.

The images 510 with labeled tattoos are provided to block 520, where for all labeled tattoos, the size of each tattoo is checked. If a tattoo's size is more than 32×32 (block 524), the tattoo is kept as it is. In other words, the tattoo is not modified. Otherwise, if the size of a tattoo is less than 32×32 pixels (block 522), the size of this tattoo is increased to at least 32×32 pixels by padding the width and height (block 526). For example, if a tattoo size is 16×16 pixels, the exemplary embodiments will pad 8 pixels to all four directions of the tattoo location so that the tattoo size becomes 32×32 pixels. Then all tattoo objects in the training dataset 530 have a size at least of 1024 pixels.

Figure 6:
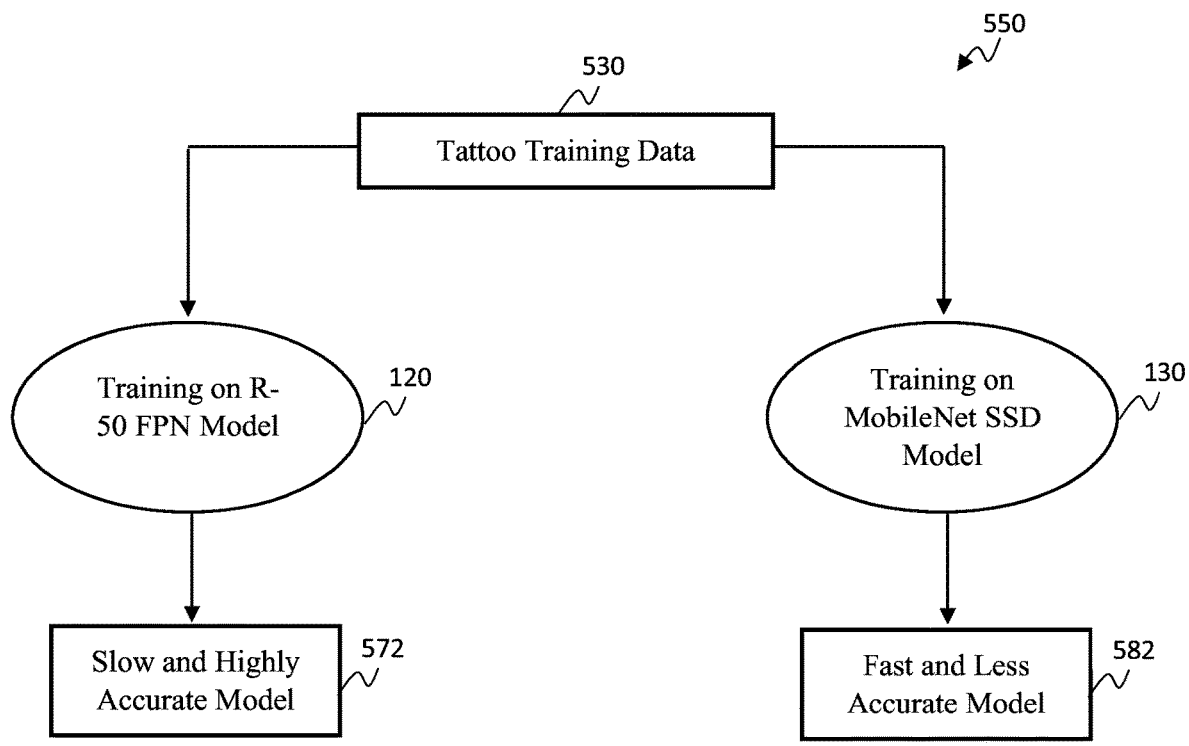
FIG. 6 is a block/flow diagram illustrating training models employed for better accuracy or better execution time, in accordance with embodiments of the present invention.

FIG. 6 is a block/flow diagram 550 illustrating training models employed for better accuracy or better execution time, in accordance with embodiments of the present invention.

FIG. 6 illustrates two models, R-50-FPN 120 and MobileNet-SSD 130. R-50-FPN model 120 is a large model, which can only achieve real-time speed on a high performance GPGPU, but it can achieve a much higher accuracy (block 572). MobileNet-SSD 130 is a deep learning model, which can achieve a real-time performance on a CPU, but with a lower accuracy (block 582).

Figure 7:
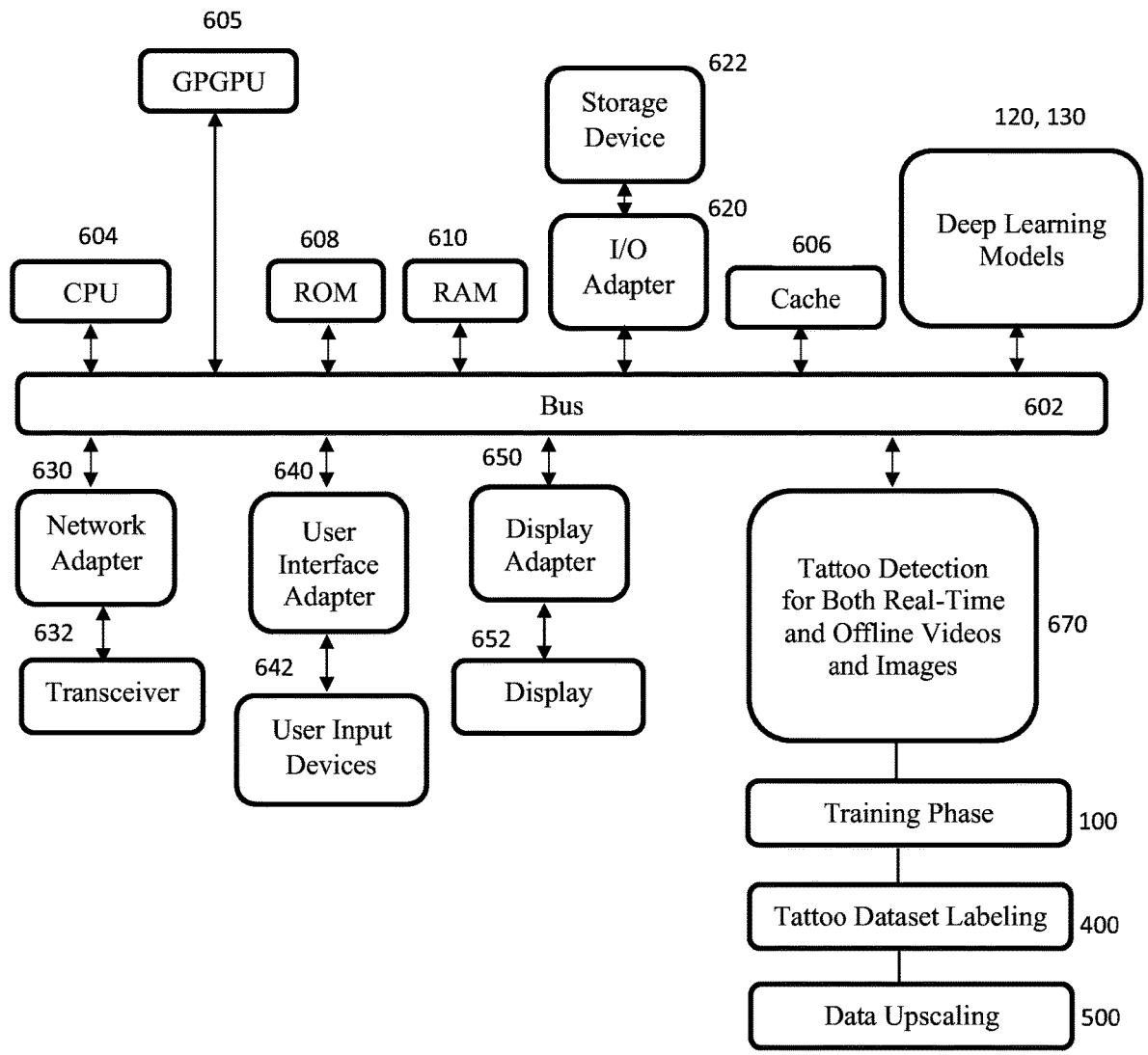
FIG. 7 is an exemplary processing system for tattoo detection, in accordance with embodiments of the present invention.

FIG. 7 is an exemplary processing system for tattoo detection, in accordance with embodiments of the present invention.

The processing system includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, deep learning models 120, 130 can be employed for tattoo detection. The tattoo detection 670 for both real-time and offline videos and images can be implemented by training system 100 (FIG. 1), tattoo dataset labeling system 400 (FIG. 4), and data upscaling system 500 (FIG. 5).

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
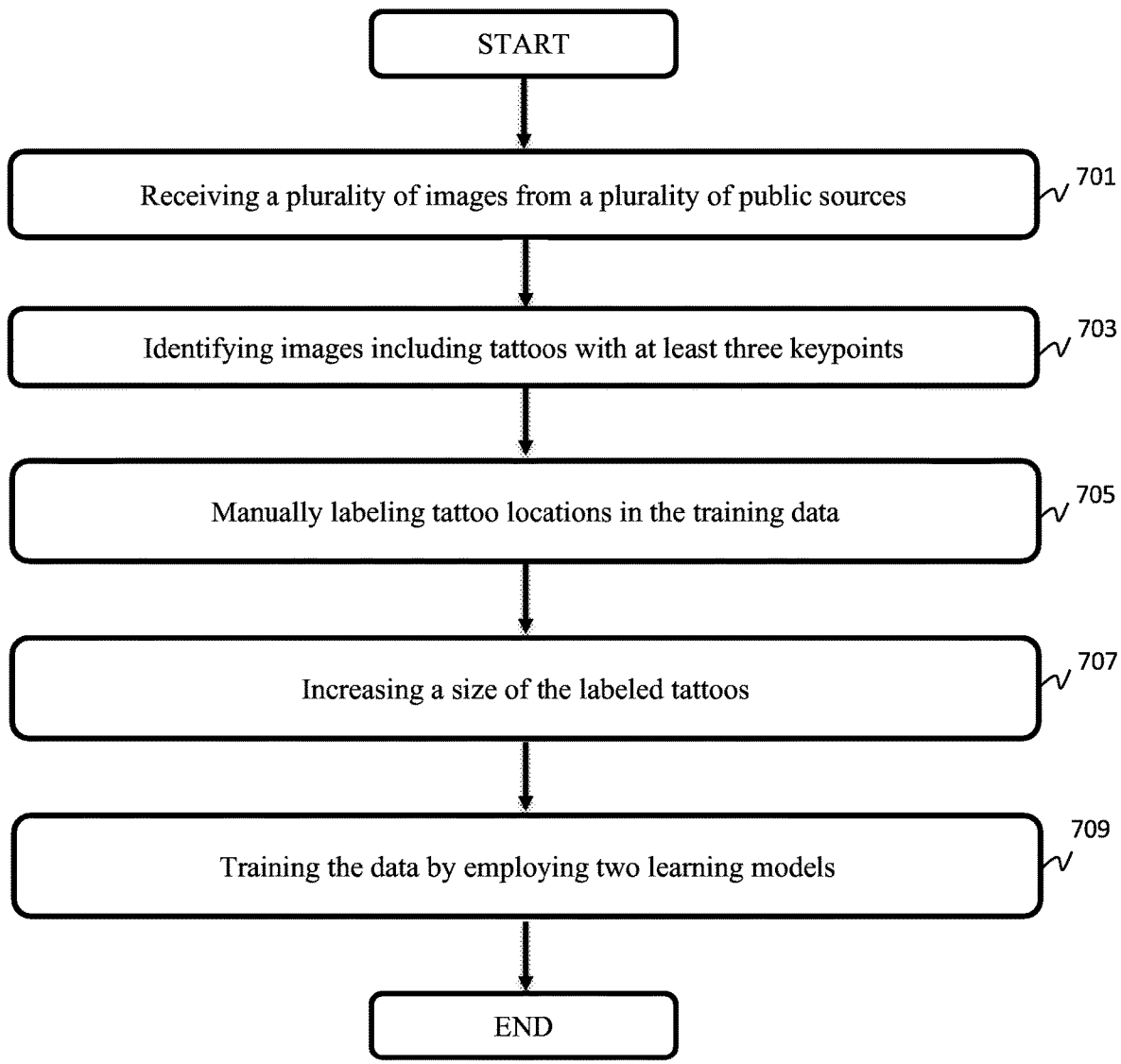
FIG. 8 is a block/flow diagram of a method for tattoo detection, in accordance with embodiments of the present invention.

FIG. 8 is a block/flow diagram of a method for tattoo detection, in accordance with embodiments of the present invention.

At block 701, a plurality of images are received from a plurality of public sources.

At block 703, images including tattoos with at least three people keypoints are identified.

At block 705, tattoo locations in the training data are manually labeled.

At block 707, a size of the labeled tattoos is increased.

At block 709, the data is trained by employing two learning models.

Figure 9:
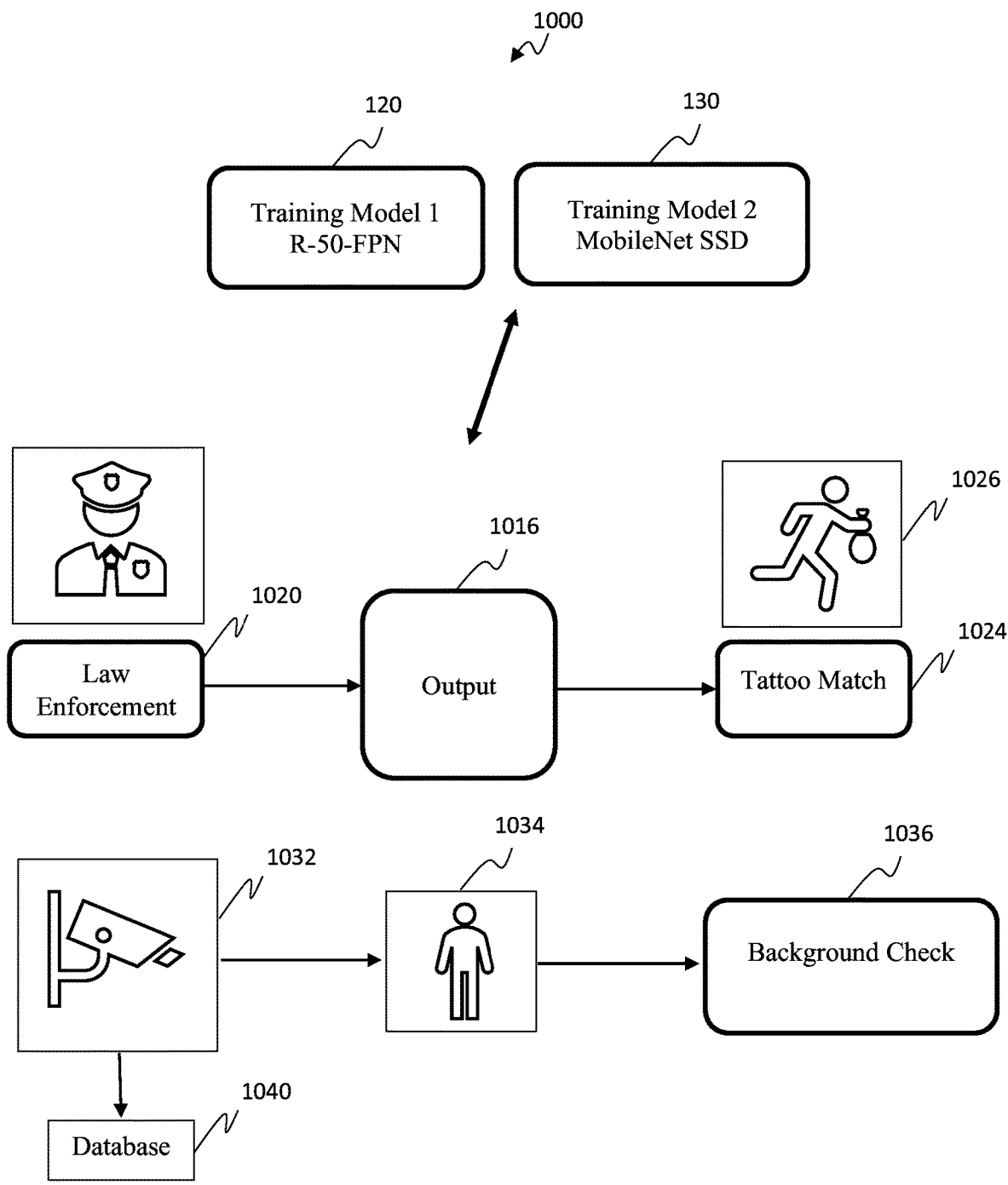
FIG. 9 is a block/flow diagram of practical applications for the tattoo detection, employing the two deep learning models, in accordance with embodiments of the present invention.

FIG. 9 is a block/flow diagram of practical applications for the tattoo detection, employing the two deep learning models, in accordance with embodiments of the present invention.

The exemplary embodiments of the present invention can be implemented in several practical applications. In one example, the system 1000 includes two deep learning training models 120, 130. In one example, law enforcement 1020, e.g., a police officer, may need tattoo information as part of an identification of a potential suspect 1034. The tattoo system with training models 120 and 130 can automatically detect tattoos from the pictures taken of the suspect 1034 and store these tattoos in a database 1040 associated with the suspect's profile. In other words, the law enforcement 1020 doesn't have to manually mark each tattoo of the suspect 1034 and then save it to the database 1040. Instead, the pictures of tattoos are automatically saved as they are detected by capturing devices 1032.

In another example, law enforcement 1020, e.g., a police officer, may want to browse through the database including the output 1016. The law enforcement personnel 1020 can browse through the labeled tattoo images 1016 to determine whether there is a tattoo match 1024 with a potential suspect 1026. The law enforcement personnel 1020 may have apprehended the potential suspect 1026 that got away. However, the law enforcement personnel 1020 may have noticed a unique or distinctive tattoo on the suspect's arm that is a known gang related tattoo. The law enforcement personnel 1020 can browse the database 1040 to find similar tattoos that match the tattoo he/she has seen on the potential suspect 1026. Of course, if a snapshot of the potential suspect 1026 (obtained from cameras in the vicinity of the potential suspect 1026) was captured, such snapshot may reveal a distinctive tattoo.

In yet another example, a camera 1032 can detect an individual 1034 with a tattoo on his entire leg. This can be considered a very unique or distinctive tattoo by a user evaluating the camera frames. The user can perform, e.g., a background check 1036 on the individual 1034 and determine whether or not the individual 1034 has a criminal history. If the individual 1034 does not have a criminal history, then the tattoo obscuring module of the camera 1032 obscures the tattoo on the tattoo image generated. If the individual 1034 does have a criminal history, then a tattoo obscuring module of the camera 1032 does not obscure the tattoo on the tattoo image generated, which can be evaluated by law enforcement 1020. Of course, one skilled in the art can contemplate a plurality of other different practical applications for using the tattoo image database 1040.

In summary, the exemplary embodiments of the present invention detect tattoos from a video stream or an offline video/image. The exemplary embodiments filter data to find accurate and acceptable detection training images with enough background information (e.g., sufficient auxiliary or supplemental or additional information related to the tattoos). A people keypoint model is used to detect people with tattoos. Only images with enough supplemental or auxiliary people information related to the tattoos (at least three keypoints) are used for tattoo detection. Moreover, the exemplary embodiments define a systematic approach to label a tattoo object. For example, tattoo areas connected physically are considered together as a tattoo object. Close tattoo areas with similar drawing and color style are considered together as a tattoo object. A large number of small tattoos are considered together as a tattoo object. The exemplary embodiments increase the deep learning detection accuracy for small size tattoos. For example, a tattoo with a small size will be upscaled to a large tattoo through padding. The exemplary embodiments further include two models to balance the accuracy and execution time, that is, a R-50-FPN model used for higher accuracy with long execution time and a MobileNet-SSD model used for low cost hardware without GPGPUs. The exemplary embodiments use the R-50-FPN model for offline process, and real-time video processing with GPGPU. The exemplary embodiments use the MobileNet-SSD model for real-time processing without GPGPU.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for detecting tattoos on a human body, the method comprising:
   inputting a plurality of images into a tattoo detection module;
   selecting one or more images of the plurality of images including tattoos with at least three keypoints, the at least three keypoints having auxiliary information related to the tattoos;
   manually labeling tattoo locations in the plurality of images including tattoos to create labeled tattoo images;
   increasing a size of the labeled tattoo images identified to be below a predetermined threshold by padding a width and height of the labeled tattoo images;
   training two different tattoo detection deep learning models with the increased size labeled tattoo images defining tattoo training data; and
   executing either the first tattoo detection deep learning model or the second tattoo detection deep learning model based on a performance of a general-purpose graphical processing unit (GPGPU).

2. The method of claim 1, wherein the first tattoo detection deep learning model is a R-50-feature pyramid network (FPN) detection model and the second tattoo detection deep learning model is a MobileNet single shot detector (SSD) detection model.

3. The method of claim 1, wherein the tattoos are labeled based on physical connections, color styles, and drawing styles.

4. The method of claim 1, wherein the predetermined threshold is 32×32 pixels.

5. The method of claim 1, wherein each labeled tattoo image over a predetermined size is assigned a tattoo object.

6. The method of claim 1, wherein, if multiple tattoos are located on a single human body, it is determined whether the multiple tattoos are physically connected, and if physically connected, a tattoo object is defined including all of the multiple tattoos.

7. The method of claim 1, wherein, if multiple tattoos below a predetermined size are located on a single human body, the multiple tattoos below the predetermined size are grouped together to define a single tattoo object.

8. A system for detecting tattoos on a human body, the system comprising:
a memory; and
a processor in communication with the memory, wherein the processor runs program code to:
input a plurality of images into a tattoo detection module;
select one or more images of the plurality of images including tattoos with at least three keypoints, the at least three keypoints having auxiliary information related to the tattoos;
manually label tattoo locations in the plurality of images including tattoos to create labeled tattoo images;
increase a size of the labeled tattoo images identified to be below a predetermined threshold by padding a width and height of the labeled tattoo images;
train two different tattoo detection deep learning models with the increased size labeled tattoo images defining tattoo training data; and
execute either the first tattoo detection deep learning model or the second tattoo detection deep learning model based on a performance of a general-purpose graphical processing unit (GPGPU).

9. The system of claim 8, wherein the first tattoo detection deep learning model is a R-50-feature pyramid network (FPN) detection model and the second tattoo detection deep learning model is a MobileNet single shot detector (SSD) detection model.

10. The system of claim 8, wherein the tattoos are labeled based on physical connections, color styles, and drawing styles.

11. The system of claim 8, wherein the predetermined threshold is 32×32 pixels.

12. The system of claim 8, wherein each labeled tattoo image over a predetermined size is assigned a tattoo object.

13. The system of claim 8, wherein, if multiple tattoos are located on a single human body, it is determined whether the multiple tattoos are physically connected, and if physically connected, a tattoo object is defined including all of the multiple tattoos.

14. The system of claim 8, wherein, if multiple tattoos below a predetermined size are located on a single human body, the multiple tattoos below the predetermined size are grouped together to define a single tattoo object.

15. A non-transitory computer-readable storage medium comprising a computer-readable program for detecting tattoos on a human body, wherein the computer-readable program when executed on a computer causes the computer to perform the steps of:
inputting a plurality of images into a tattoo detection module;
selecting one or more images of the plurality of images including tattoos with at least three keypoints, the at least three keypoints having auxiliary information related to the tattoos;
manually labeling tattoo locations in the plurality of images including tattoos to create labeled tattoo images;
increasing a size of the labeled tattoo images identified to be below a predetermined threshold by padding a width and height of the labeled tattoo images;
training two different tattoo detection deep learning models with the increased size labeled tattoo images defining tattoo training data; and
executing either the first tattoo detection deep learning model or the second tattoo detection deep learning model based on a performance of a general-purpose graphical processing unit (GPGPU).

16. The non-transitory computer-readable storage medium of claim 15, wherein the first tattoo detection deep learning model is a R-50-feature pyramid network (FPN) detection model and the second tattoo detection deep learning model is a MobileNet single shot detector (SSD) detection model.

17. The non-transitory computer-readable storage medium of claim 15, wherein the tattoos are labeled based on physical connections, color styles, and drawing styles.

18. The non-transitory computer-readable storage medium of claim 15, wherein the predetermined threshold is 32×32 pixels.

19. The non-transitory computer-readable storage medium of claim 15, wherein each labeled tattoo image over a predetermined size is assigned a tattoo object.

20. The non-transitory computer-readable storage medium of claim 15, wherein, if multiple tattoos are located on a single human body, it is determined whether the multiple tattoos are physically connected, and if physically connected, a tattoo object is defined including all of the multiple tattoos.

* * * * *